J. H. ROADMAN.
GLASS OVEN OR LEER.
APPLICATION FILED JAN. 30, 1913.

1,096,058.

Patented May 12, 1914.
3 SHEETS—SHEET 2.

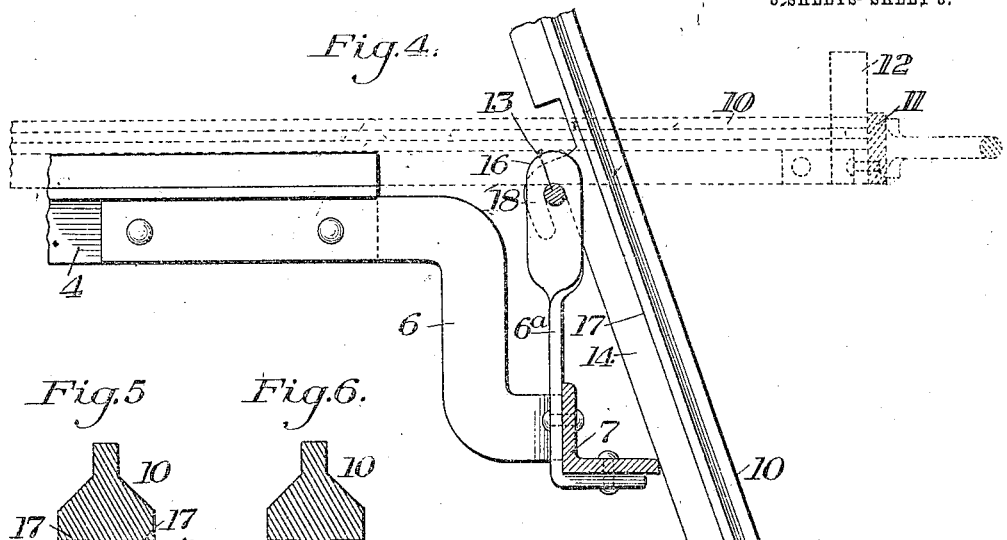

UNITED STATES PATENT OFFICE.

JOHN H. ROADMAN, OF NEW EAGLE, PENNSYLVANIA, ASSIGNOR TO WINDOW GLASS MACHINE COMPANY, OF PITTSBURGH, PENNSYLVANIA, A CORPORATION OF NEW JERSEY.

GLASS-OVEN OR LEER.

1,096,058.  Specification of Letters Patent.  Patented May 12, 1914.

Application filed January 30, 1913. Serial No. 745,121.

*To all whom it may concern:*

Be it known that I, JOHN H. ROADMAN, a citizen of the United States, and resident of New Eagle, Washington county, Pennsylvania, have invented a new and useful Improvement in Glass-Ovens or Leers, of which the following is a full, clear, and exact description, reference being had to the accompanying drawings, forming part of this specification, in which—

Figure 1:
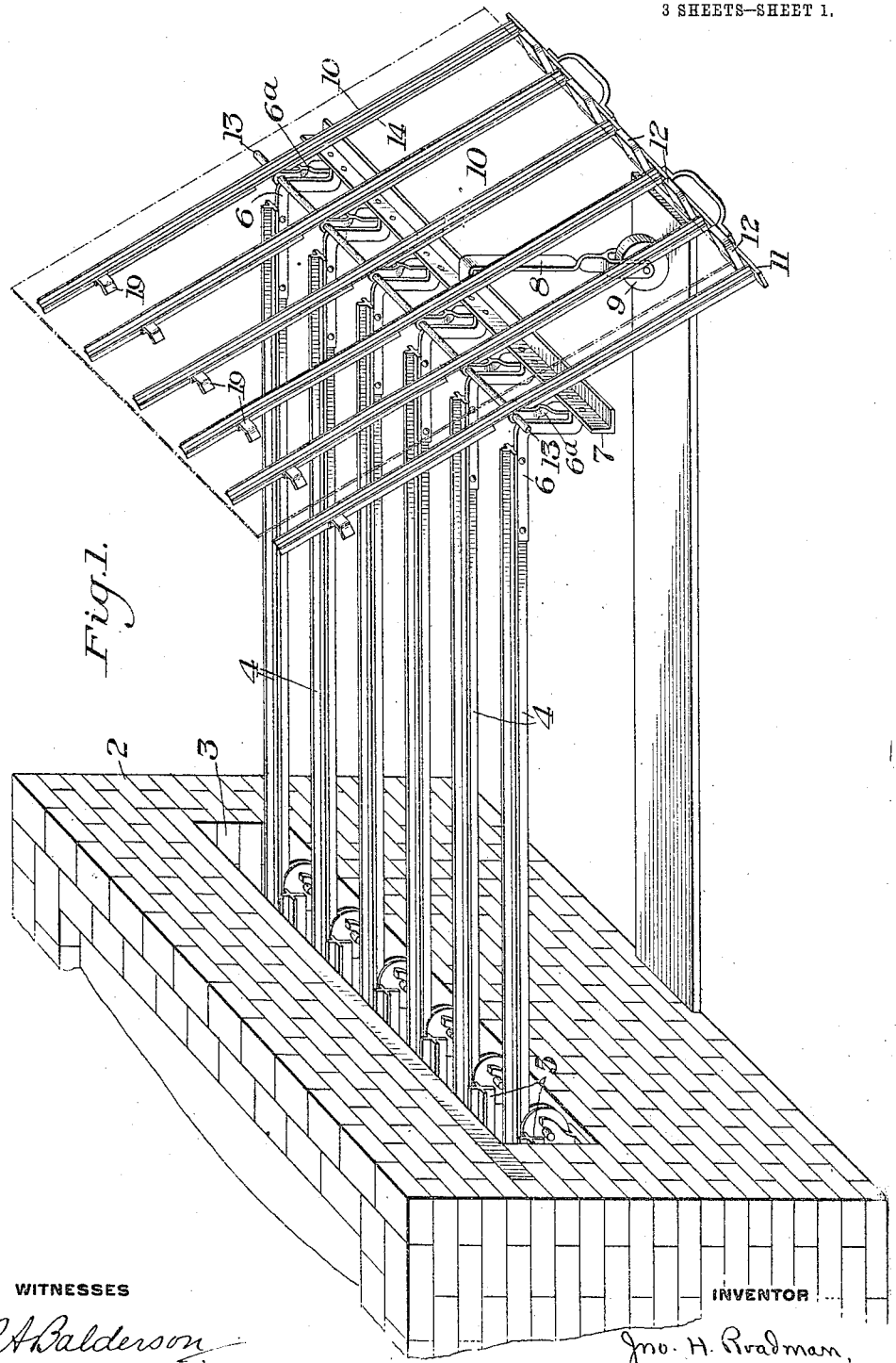
Figure 2:
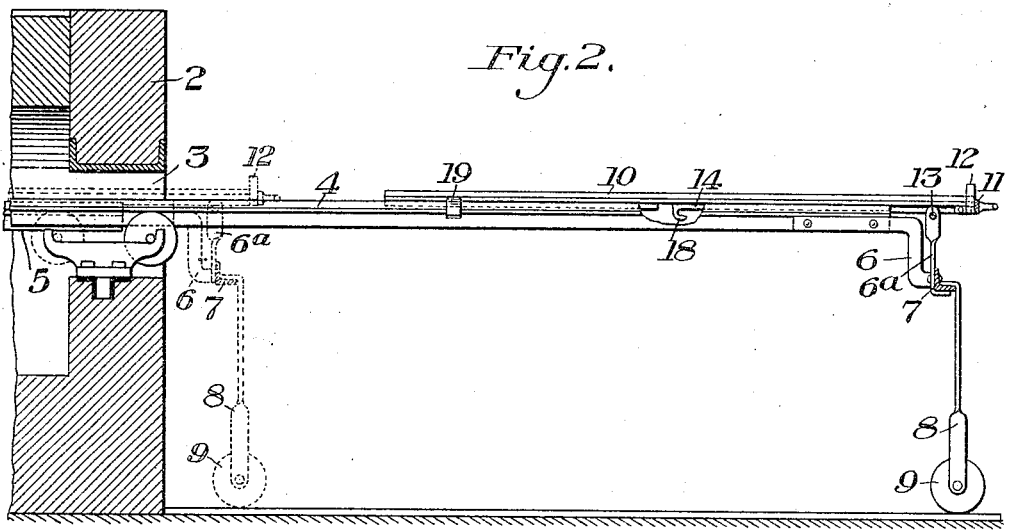
Figure 3:
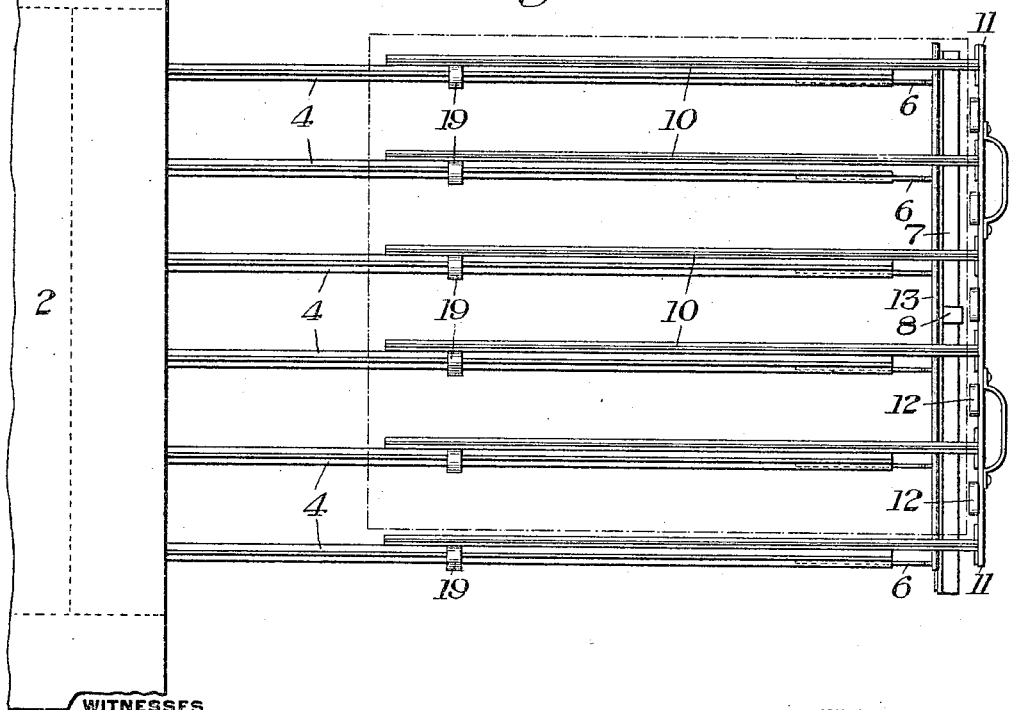

Figure 1 is a perspective view of a portion of a glass oven or leer embodying my invention; Fig. 2 is a view of the same partly in vertical section and partly in side elevation; Fig. 3 is a plan view of the same with the cradle in its horizontal position; Fig. 4 is a detail view showing the cradle in tipped position; Figs. 5 and 6 are detail sectional views showing different ways of supporting the cradle; Fig. 7 is a detail view showing one of the guiding clips; and Fig. 8 is a detail view of one of the hook members.

My invention has relation to glass ovens or leers, and more particularly to ovens or leers for flattening and annealing glass sheets of relatively large sizes.

The invention has still more particular relation to means of novel character for effecting the removal of the glass sheets from the delivery end of the leer and from the leer bars or rods.

Prior to my invention, it has been customary to remove the glass sheets from the leer rods or bars by manual manipulation, the sheets being turned on the bars or rods and swung over them onto the floor. In this turning operation, considerable damage to the glass has resulted from scratches caused by turning it; and there has been a considerable percentage of breakage due to strains and sagging of the glass while handling it and swinging it from the leer rods onto the floor. My invention is designed to eliminate these objections, and to provide simple, convenient and efficient means whereby glass sheets of varying sizes may be quickly and easily removed from the leer rods or bars without injury thereto and in a manner to practically eliminate all losses by breakage. My invention also greatly simplifies the leer tending, as the device can be operated without the skilled labor formerly required. It also reduces the cost of repairs, and the danger of injury to the leer tender.

The nature of my invention will be best understood by reference to the accompanying drawings, in which I have shown the preferred embodiment thereof, and which will now be described, it being premised, however, that various changes can be made in the details of construction and arrangement of the parts without departing from the spirit and scope of my invention as defined in the appended claims.

In these drawings, the numeral 2 designates the rear or delivery end of a glass oven or leer, having the delivery opening 3.

4 designates the usual longitudinally reciprocating leer bars or rods, and 5 the usual series of vertically reciprocating leer bars or rods, these two sets of bars or rods operating in a well known manner to carry the glass sheets through the oven or leer. Secured to the outer end of each bar 4 is a drop or angle bracket 6, the lower arms of these brackets being connected by a bar 7. This bar is preferably provided with a depending leg 8 having a supporting wheel or roller 9 journaled to its lower end portion.

10 designates a sliding and tiltable cradle, which is shown as composed of a plurality of parallel bars, connected at their outer ends by a cross-bar 11, having secured thereto a plurality of blocks 12. These blocks are preferably of wood, and constitute means for receiving and supporting the lower edges of the glass sheets when the cradle is in tipped position. The parallel bars of this cradle have a sliding engagement with a transverse rod 13 mounted on the brackets 6ª. For this purpose the bars may have depending webs 14 (Fig. 5), which rest and slide upon the upper surface of the rod 13; or the rod may be provided, if desired, with rollers 15 (see Fig. 6), upon which these webs rest. The brackets 6ª, which support the rod 13 are shown as forked to receive the depending webs 14; and the upper ends of the fork arms may be rounded, as shown at 16, to engage the flat surfaces 17 on the cradle bars at each side of the web 14. The cradle bars are also provided with the open rearwardly directed hooks 18, which, as the cradle is drawn backwardly into position to be tilted, engage the rod 13 and thus form a pivotal bearing on which the cradle may be tilted into the position shown in Figs. 1 and 4. The cradle bars are also preferably provided with the guide clips 19, adapted to have a sliding engagement with the leer bars or rods 4. The cradle bars are arranged intermediately of the leer bars or rods 4 and 5.

The operation is as follows:—The cradle being in the horizontal position shown in Fig. 2, the series of leer bars 4 are pushed forwardly into the oven or leer carrying the cradle with them, to the position indicated in dotted lines in Fig. 2. The glass sheet to be removed is transferred to the cradle by the lowering of the leer bars 5 in the usual manner. The leer bars or rods 4 are then moved backwardly to the position shown in full lines in Fig. 2, with the cradle resting thereon. The cradle is then slid backwardly to a position in which the hook members 13 will engage the rod 13, and is then tipped to the position shown in Figs. 1 and 4. The sheet of glass is now in a nearly vertical position, and can be readily removed from the cradle without turning it and without danger of scratching or breaking it.

The advantages of my invention will be apparent to those skilled in the art, since it provides an extremely simple and convenient means for removing the glass sheets without injury thereto and without danger of breakage. Actual experience with the device has shown that the injury to and breakage of the glass is reduced to a practical negligible quantity. The use of my invention also obviates the necessity for the highly skilled labor which has heretofore been necessary in removing the sheets.

It will be obvious that the construction of the cradle, and the manner of mounting it, may be widely varied within the scope of the appended claims.

I claim:—

1. A glass oven or leer, having a series of longitudinally arranged leer bars or rods whose end portions are movable into and out of the delivery opening of the oven or leer, and a glass receiving device carried by said end portions and mounted therein, said device being mounted to tilt in a vertical plane, substantially as described.

2. A glass oven or leer, having a series of longitudinally arranged leer bars or rods whose end portions are movable into and out of the delivery opening of the oven or leer, and a glass receiving device mounted to slide longitudinally on said rods and also to tilt in a vertical plane, substantially as described.

3. A glass oven or leer, having a series of longitudinally arranged leer bars or rods whose end portions are movable into and out of the delivery opening of the oven or leer, and a glass receiving device mounted to slide longitudinally on said rods and also to tilt in a vertical plane, and comprising a series of longitudinal members arranged to lie substantially parallel with said bars or rods, substantially as described.

4. A glass oven or leer having a series of longitudinally reciprocating leer bars or rods, a transverse supporting member at the rear end portions thereof, and a glass-receiving and removing cradle slidably mounted on said member and having means for pivotally engaging the same; substantially as described.

5. A glass oven or leer having reciprocating leer bars or rods, and a sheet-receiving and removing device mounted to slide longitudinally on the bars or rods and also for vertical tilting movement with respect thereto; substantially as described.

6. A glass oven or leer having reciprocating leer bars or rods, and a sheet-receiving and removing device mounted to slide longitudinally on the bars or rods and also for vertical tilting movement with respect thereto, said device comprising a plurality of longitudinal members arranged intermediately of the said bars or rods; substantially as described.

7. A glass oven or leer having reciprocating leer bars or rods, and a sheet-receiving and removing device mounted to slide longitudinally on the bars or rods and also for vertical tilting movement with respect thereto, said device comprising a plurality of longitudinal members arranged intermediately of the said bars or rods and having a guiding engagement therewith; substantially as described.

In testimony whereof, I have hereunto set my hand.

JOHN H. ROADMAN.

Witnesses:
C. W. GARBART,
W. G. GIBSON.